United States Patent [19]

Yoshino et al.

[11] 4,107,052
[45] Aug. 15, 1978

[54] FUEL TANK WATER SEPARATOR ASSEMBLY

[75] Inventors: Tsuneo Yoshino; Junji Tatsuma, both of Yokohama, Japan

[73] Assignee: Caterpillar Mitsubishi Ltd., Tokyo, Japan

[21] Appl. No.: 804,957

[22] Filed: Jun. 9, 1977

[30] Foreign Application Priority Data

Aug. 10, 1976 [JP] Japan ............................ 51-106144[U]

[51] Int. Cl.$^2$ ............................................ B01D 12/00
[52] U.S. Cl. ................................... 210/534; 137/172
[58] Field of Search ................. 210/532 R, 533–535, 210/172; 137/172

[56] References Cited

U.S. PATENT DOCUMENTS

| | | | |
|---|---|---|---|
| 1,518,686 | 12/1924 | Bland | 210/533 |
| 1,714,338 | 5/1929 | Yeomgren | 210/534 |
| 2,339,303 | 1/1944 | Tillery | 210/172 |
| 2,896,657 | 7/1959 | Uhll et al. | 137/172 |
| 3,012,675 | 12/1961 | Phelps et al. | 210/533 |

*Primary Examiner*—William A. Cuchlinski, Jr.
*Assistant Examiner*—Jon E. Hokanson
*Attorney, Agent, or Firm*—Charles E. Lanchantin, Jr.

[57] ABSTRACT

A fuel tank water separator assembly includes a tank, a water separating plate having a sloping portion and a top part and a bottom part on the sloping portion. The plate is connected to the tank and defines therewith communicating upper and lower chambers, the plate and the tank being of a construction sufficient for gravity settling and separation of water from the fuel in response to movement of the water along the sloping portion of the plate. A first opening at the bottom part of the sloping portion passes fluid to the lower chamber, and a second opening at the top part passes displaced fuel to the upper chamber.

3 Claims, 5 Drawing Figures

— 1 —

FUEL TANK WATER SEPARATOR ASSEMBLY

BACKGROUND OF THE INVENTION

This invention relates generally to a fuel tank, and more particularly to a fuel tank water separator assembly, preferably for use on a vehicle.

While fuel tanks for earthmoving vehicles are of substantial capacity, it is still often necessary to add fuel to the tanks from large drums or cans stored at the working site. Unfortunately, these drums are usually stored outdoors so that rain water collects on the drums and can inadvertently mix with the fuel. As a consequence of these outdoor conditions, such as the necessity of filling the fuel tanks in rainy weather, water can get into the fuel in the tank.

During subsequent operation of the vehicle the water and fuel are agitated so that a fuel and water mixture is fed to the engine's fuel system. This causes engine operating problems, and excessive wear of moving parts in the fuel system. In addition, the water in the tank and associated passages produces rust, which in turn is fed into the fuel supply system and results in clogging and/or greater rates of engine wear.

Many attempts have been proposed for removing water from the fuel tank, such as a water separator installed in a suitable position in the fuel supply system or a water drain secured to the bottom surface of the fuel tank. However, these former attempts have generally failed to completely separate water from the fuel or have suffered from capacity limitations of the added water separator. Moreover, prior water separators generally fail to discharge water alone from the tank completely. Water flowed in the form of a swirl above the exit in the tank and tended to dwell in the corners of the tank. It is therefore necessary that a considerable amount of fuel be wastefully discharged through the bottom of the tank in order to insure that all the water is removed therefrom.

SUMMARY OF THE INVENTION

The present invention is directed to overcoming one or more of the problems as set forth above.

According to the present invention this is accomplished by providing a fuel tank water separator assembly including a tank, a water separating plate having a sloping portion and a top part and a bottom part on the sloping portion. The plate is connected to the tank and defines therewith communicating upper and lower chambers, the plate and the tank being of a construction sufficient for gravity settling and separation of water from the fuel in response to movement of the water along the sloping portion of the plate. A first opening at the bottom part of the sloping portion of the plate passes fluid to the lower chamber, and a second opening at the top part passes displaced fuel from the lower to the upper chamber.

DETAILED DESCRIPTION

Figure 1:
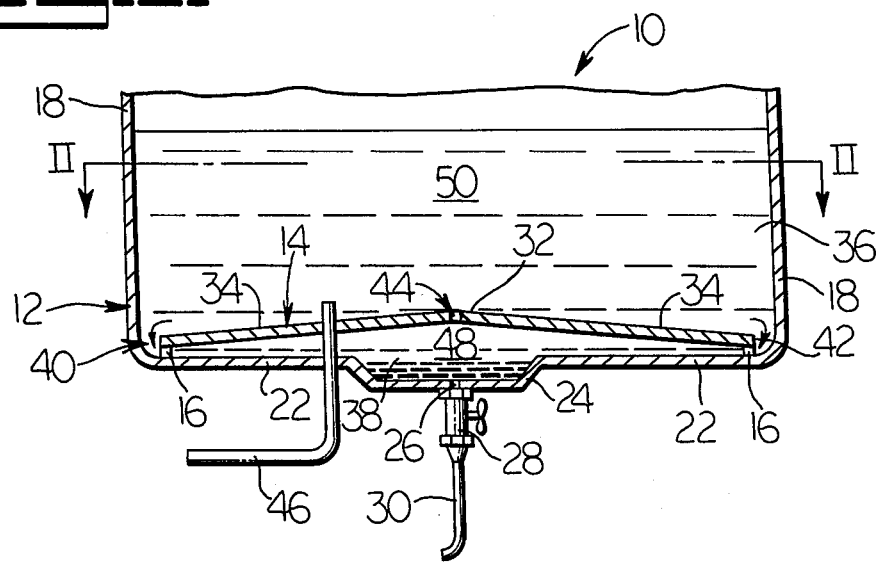
FIG. 1 is a diagrammatic vertical sectional view through the fuel tank water separator assembly of the present invention.
Figure 2:
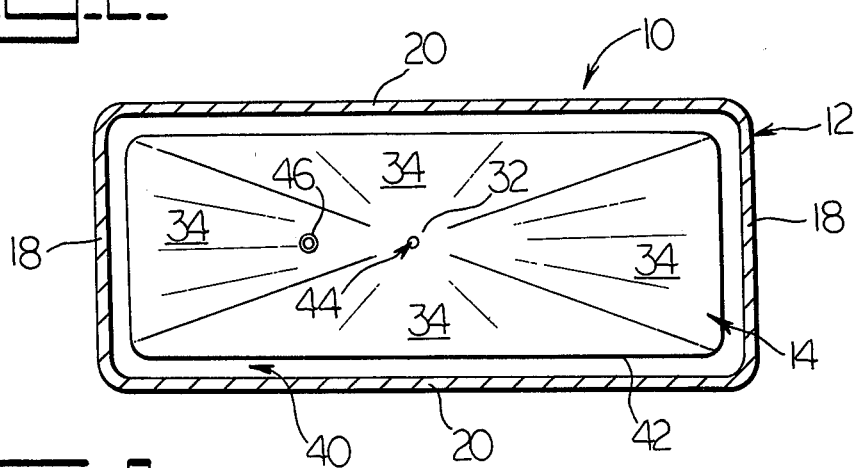
FIG. 2 is a diagrammatic sectional plan view through the fuel tank water separator assembly of the present invention taken along line II—11 of FIG. 1.

Referring initially to FIGS. 1 and 2, there is shown a fuel tank water separator assembly 10 having a fuel tank 12, a water separating plate 14, and two or more supports or supporting blocks 16 connected therebetween. The fuel tank has a pair of upright end walls 18, a pair of upright side walls 20, and a bottom member 22 having a concave water-storing sump portion 24 formed substantially centrally therein. Furthermore, a drain opening 26 is defined in the sump portion and is adapted to receive a conventional water drain valve 28 and an associated outlet drain tube 30.

In the instant example, the water separating plate 14 extends over almost the entire surface of the bottom member 22 and has a generally convex or open-umbrella configuration defining a substantially centrally located apex 32 and four sloping portions 34 extending downwardly and radially away therefrom. Thus, it is apparent that each sloping portion has a top part and a bottom part, with the bottom parts thereof secured or welded to the bottom member 22 through the medium of the supports 16. Preferably, the water separating plate is juxtaposed closely over the sump portion 24 to divide the fuel tank 12 into a relatively large upper chamber 36 and a relatively small lower chamber 38.

First opening means identified generally by the reference number 40 is thus defined at the bottom part of the sloping portions 34. Specifically, in the instant example, such means is an opening defined by the clearance between a lower edge 42 of each of the sloping portions peripherally about the separating plate 14 and the walls 18 and 20 of the tank 12.

Second opening means identified generally by the reference number 44 is defined at the top part of the sloping portions 34. Preferably, such second opening means is a relatively small opening formed in the separating plate 14 at the apex 32.

As best shown in FIG. 1, it is apparent that a fuel egress conduit or pipe 46 extends upwardly through the tank 12 and the water separating plate 14 so that it projects upwardly from the surface of the plate and substantially into the upper chamber 36.

In operation, water 48 in the fuel tank 12 is greater in specific weight than fuel 50, so that the water descends with passing of time until it reaches the water separating plate 14. As the water descends by the natural action of gravity it runs along the sloping portions 34 of the plate, over the lower edge 42, through the first opening means 40 and into the lower chamber 38 and the concave sump portion 24. Preferably, to enhance the separation of the water from the fuel without the introduction of undue turbulence, the inclination angle of such sloping portions is at least about 5° relative to a horizontal plane. As shown generally by the flow indicating arrows in FIG. 1, water runs around the lower edge of the separating plate to thereby preclude the possibility of water dwelling in the corners of the tank. The rate of such flow is, of course, enhanced upon the draining of water from the sump portion through manual opening of the water drain valve 28.

Moreover, water 48 which has entered the lower chamber 38 and settled in the area of the sump portion 24, displaces the fuel 50 so that a corresponding quantity of fuel is forced upwardly through the second opening means 44 because of its lower specific gravity. As a result, substantially water free fuel advantageously remains above the separating plate 14, while water is collected below it.

Figure 3:
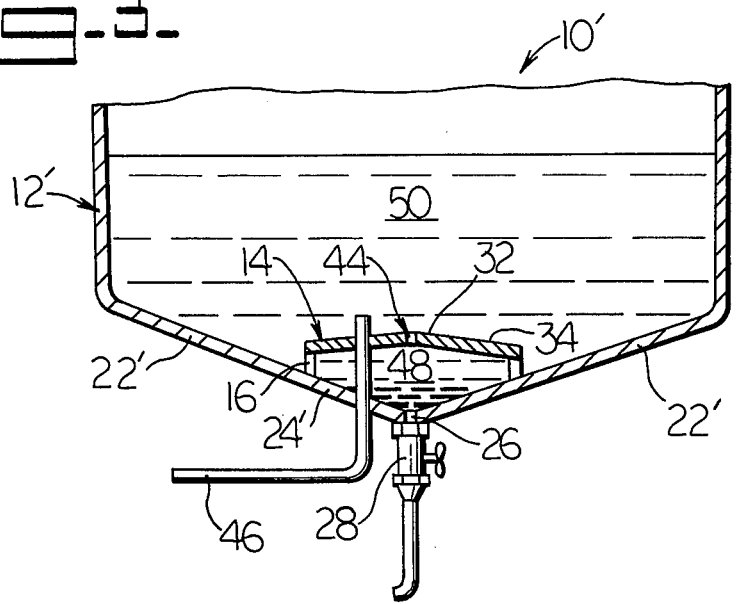
FIG. 3 is a diagrammatic vertical sectional view through a first alternate embodiment fuel tank water separator assembly which may be compared with FIG. 1.

FIG. 3 shows a first alternate embodiment fuel tank water separating assembly 10', with the portions thereof which are similar to the preferred embodiment bearing identical reference characters. In FIG. 3, however, the bottom member 22' is of V-shaped cross section so that only its central area defines the concave sump portion 24'. Water in the fuel descends not only radially outwardly from the apex 32 of the separating plate 14 along the surface of the sloping portions 34, but also radially inwardly along the surface of the bottom member 22' and toward the drain opening 26. Again, the water separating plate is of multisided, downwardly depending or open-umbrella shape and is juxtaposed immediately over the concave sump portion 24'. And, though its size is reduced appreciably from that of the preferred embodiment, the separating plate is located in such a juxtaposed position with respect to the bottom member 22' that it minimizes the agitation of the fuel and water and tends to prevent further mixing thereof even though the fuel tank 12' is mounted on a vehicle traveling over irregular terrain.

Figure 4:
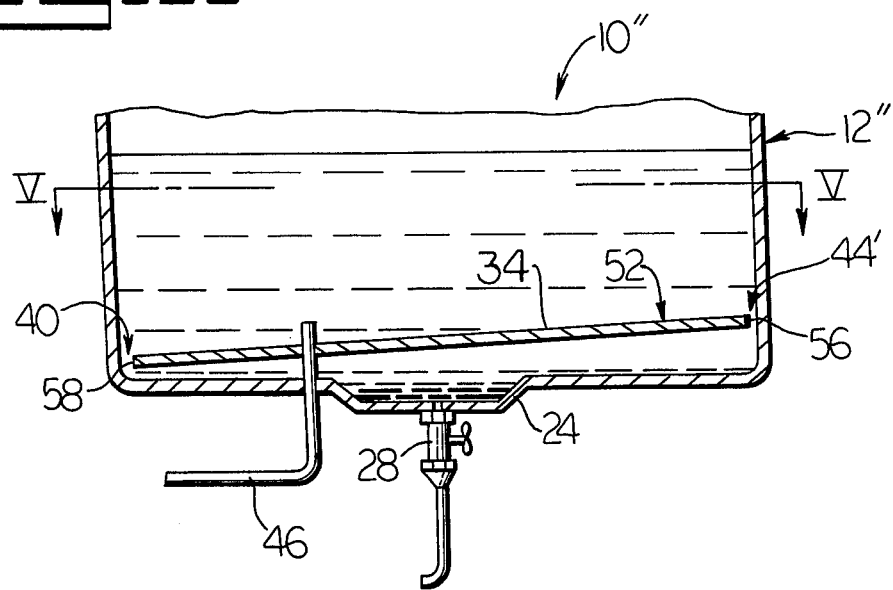
FIG. 4 is a diagrammatic vertical sectional view through a second alternate embodiment fuel tank water separator assembly.
Figure 5:
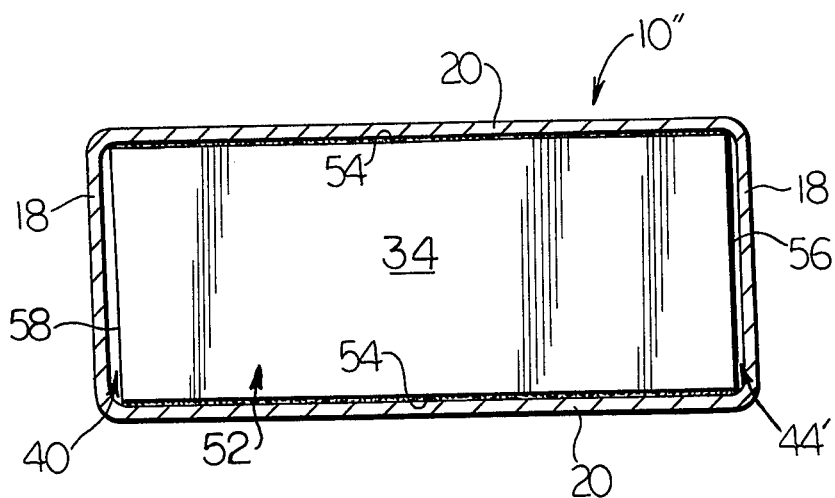
FIG. 5 is a diagrammatic section plan view through the second alternate embodiment fuel tank water separator assembly taken along line V—V of FIG. 4.

FIGS. 4 and 5 show a second alternate embodiment fuel tank water separating assembly 10" which is principally directed to the prevention of the agitation of the fuel and water in the tank 12". In this embodiment a separating plate 52 has a pair of lengthwise side edges 54, and a single lengthwise inclined slope portion 34 defining a single top edge 56 and a single bottom edge 58. The separating plate is welded along the side edges 54 to the side walls 20 of the tank so that the first opening means 40 is defined between the bottom edge and one end wall 18 and the second opening means 44' is defined between the top edge and the opposite end wall. Preferably, such first and second opening means are small in order to reduce agitation of the fuel and water after water separation is enhanced in the manner previously described.

Other aspects, objects, and advantages of the present invention will become apparent from a study of the specification, drawings, and appended claims.

The embodiment of the invention in which an exclusive property or privilege is claimed are defined as follows:

1. A fuel tank water separator assembly comprising:
   a tank including a concave sump portion having a normally closed drain member therein;
   a water separating plate of a convex configuration defining a substantially centrally located apex and a plurality of sloping portions depending therefrom to a lower edge, said plate connected to said tank in juxtaposed position over said concave sump portion and defining communicating upper and lower chambers, said sloping portions serving to promote through gravity downward movement of water away from said apex toward said lower edge;
   first opening means defined between said lower edge and said tank for communicating said chambers and providing a flow path for said water from said upper chamber into said lower chamber; and
   second opening means defined at said apex of said plate for passing displaced fuel from said lower chamber to said upper chamber.

2. The separator assembly of claim 1 wherein said sloping portions of said separating plate are preferably inclined at an angle of at least 5° relative to a horizontal plane.

3. The separator assembly of claim 1 wherein said tank has a plurality of upright walls and said first opening means is a peripheral opening defined between said lower edge of said plate and said walls.

* * * * *